United States Patent [19]

Watt et al.

[11] 4,232,482
[45] Nov. 11, 1980

[54] FLOWER POT

[76] Inventors: Neill H. Watt; Lynda L. Watt, both of 1815 Valcourt, Richardson, Tex. 75081

[21] Appl. No.: 74

[22] Filed: Jan. 2, 1979

[51] Int. Cl.³ .............................................. A01G 23/02
[52] U.S. Cl. ........................................... 47/71; 47/73
[58] Field of Search .......................... 47/66, 71, 73, 79

[56] References Cited

U.S. PATENT DOCUMENTS

| | | | |
|---|---|---|---|
| 579,295 | 3/1897 | Delzell | 47/73 |
| 1,561,824 | 11/1925 | Boehm | 47/71 |
| 2,057,972 | 10/1936 | Pieck | 47/71 |
| 2,818,681 | 1/1958 | Coplen | 47/66 |
| 3,065,570 | 11/1962 | Fukuhara | 47/73 |
| 3,142,133 | 7/1964 | Brooks | 47/73 |
| 3,147,569 | 9/1964 | Murguia | 47/73 |
| 3,328,913 | 7/1967 | Vogt | 47/66 |
| 3,362,105 | 1/1968 | Steiger | 47/66 |
| 3,432,027 | 3/1969 | Mueller | 47/73 X |
| 4,027,429 | 6/1977 | Georgi | 47/73 |
| 4,043,077 | 8/1977 | Stonehocker | 47/66 |
| 4,047,329 | 9/1977 | Holt | 47/66 |
| 4,059,921 | 11/1977 | Moriwaki | 47/73 |

Primary Examiner—Edgar S. Burr
Assistant Examiner—James R. Feyrer
Attorney, Agent, or Firm—Dennis T. Griggs

[57] ABSTRACT

A container assembly for growing and transplanting plants is disclosed. The container assembly includes an open ended pot, a drainage tray, and a drainage disc removably supported on an annular flange near the bottom end of the pot. The drainage disk is movable through the pot for displacing a volume of soil and a rooted plant through the top opening without disturbing the soil surrounding the roots of the plant. The tray sidewall and pot sidewall define an open reservoir space between the sidewall of the tray and the sidewall of the pot to permit the plant to be watered from the bottom. A combination of centering ridges carried on the bottom of the tray and axially projecting feet depending from the annular flange removably support the bottom opening of the pot above the bottom surface of the tray and below the top of the tray sidewall so that water may drain from the soil into the open reservoir space, and water may be withdrawn by capillary action from the reservoir space through the botton opening to a rooted plant contained within the pot.

1 Claim, 6 Drawing Figures

FLOWER POT

BACKGROUND OF THE INVENTION

1 Field of the Invention

The present invention relates generally to pots for growing plants and more particularly to a transplant container assembly having improved drainage and transplant features.

2 Description of the Prior Art

During the lifetime of an indoor plant it is necessary to transfer the plant to a larger container as its root system expands to fill the available space within its container. According to conventional transplant methods, great care must be exercised when removing the plant from the pot to avoid damaging the roots or pulling away soil from the roots. During the transplant operation, it is desired to transfer the plant to a larger pot without disturbing the root system in order to minimize transplant shock and setback. This is particularly important for tender nursery stock where three transplantings are typically necessary between the seedling stage and the mature stage. Most tender varieties should not be pulled or otherwise handled during the transplant operation.

Therefore, it is an important object of the present invention to provide a flower pot wherein the plant and the surrounding potting soil may be readily removed without damage to the plant or to the receptacle, and without disturbing the root ball of the plant.

Another object of the invention is to provide a transplanting pot for use in cultivating seedlings which is simple in construction and which may be formed of only three parts.

Yet another object of the invention is to provide an improved transplant pot in which the plant may be watered either from the top or from the bottom and which permits excess water to drain from the potting soil into a liquid reservoir which is accessible at the bottom of the plant, and wherein moisture may be supplied to the plant through bottom watering by pouring water into the open reservoir.

SUMMARY OF THE INVENTION

According to novel features of the present invention, the foregoing objects are achieved by a transplant container assembly comprising a tray, an open ended pot, and a drainage disc which is supported over the open bottom end of the pot. The bottom opening is defined by an annular flange member which projects into the interior of the pot from the sidewall of the pot near the bottom end. The combination of the drainage disc and the pot sidewall provides a receptacle in which potting soil and a plant is received.

The drainage disc is provided with a number of drainage openings permitting water to drain from the soil through the bottom opening of the pot. The drainage disc is movable through the pot and serves the additional function of displacing the volume of potting soil and rooted plant through the top opening without disturbing the soil surrounding the roots of the plant.

The tray serves to support the pot in an upright position and also accumulates water which drains through the bottom opening. The tray and pot sidewalls define an open reservoir space which permits bottom watering. Means are interposed between the pot and the tray for removably supporting the bottom opening of the pot above the bottom surface of the tray and below the top of the tray sidewall and for providing fluid communication between the open reservoir space and the bottom opening so that proper drainage may accur during top watering, and so that moisture can be supplied to the plant by bottom watering as desired.

In a preferred embodiment, the bottom of the pot is supported at an elevated position above the bottom of the tray by a plurality of circumferentially spaced, axially projecting feet which depend from the flange. According to another preferred embodiment, the pot is supported in a centered position within the tray by means of a plurality of circumferentially spaced, curved ridge portions which project from the tray bottom of the surface and engage the bottom of the pot.

These and other related objects and advantages of the present invention will become more apparent from the following description of a preferred embodiment, claims and appended drawings.

DESCRIPTION OF THE PREFERRED EMBODIMENTS

Figure 1:
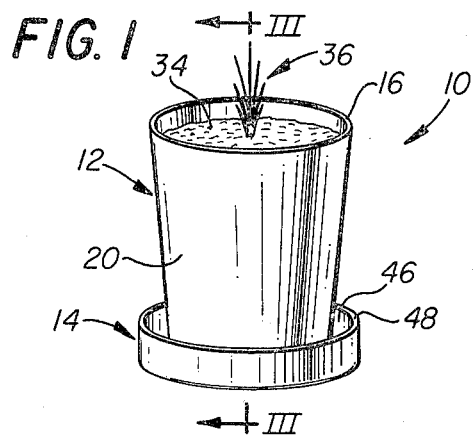
FIG. 1 is a perspective view of a transplant container assembly constructed according to the teachings of the present invention.

In the description which follows, like parts are marked throughout the specification and drawings with the same reference numerals, respectively. The figures are not necessarily drawn to scale and in some instances portions have been exaggerated in order to more clearly depict certain features of the invention.

Figure 2:
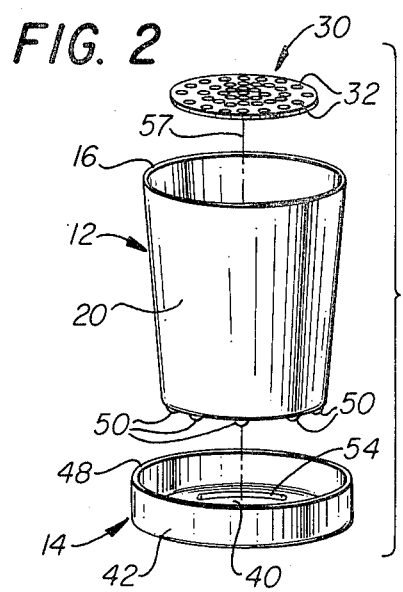
FIG. 2 is an exploded perspective view of the transplant container assembly shown in FIG. 1.
Figure 3:
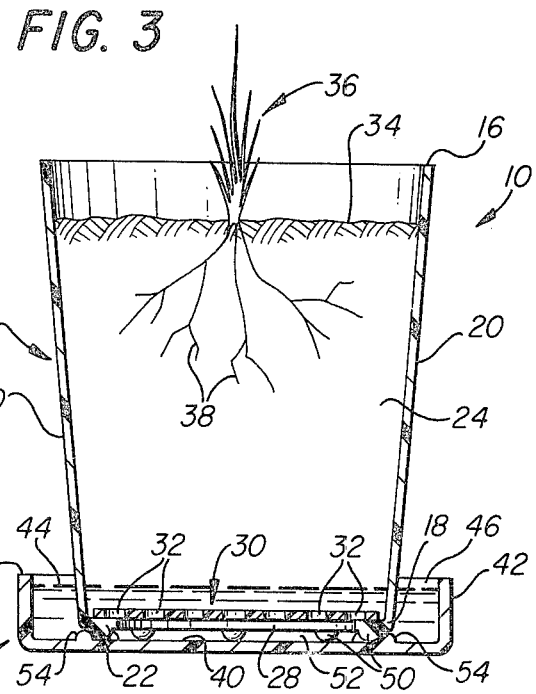
FIG. 3 is a sectional view taken along the lines III—III of the transplant container assembly shown in FIG. 1.

Referring now to the drawings, and in particular to FIGS. 1, 2 and 3 thereof, a transplant container assembly 10 includes a pot 12 which rests in a drainage tray 14. The pot 12 includes an open top end 16, an open bottom end 18, and a sidewall 20. A flange member formed by an annular lip 22 projects into the interior 24 of the pot and defines a bottom opening 26 which is radially spaced from the sidewall 20. The bottom opening 26 is bounded by the rim 28 of the lip 22.

According to an important feature of the invention, a drainage disc 30 is removably supported on the lip 22 and covers the bottom opening 26. The drainage disc 30 includes a number of drainage openings 32 (FIG. 6) overlying the bottom opening 26 of the pot for permitting water to drain from soil enclosed within the pot. The drainage disc 30 is movable through the interior of the pot for displacing a volume of soil 34 and a rooted plant 36 through the open top end 16 of the pot without disturbing the soil surrounding the roots 38 of the plant.

Figure 4:
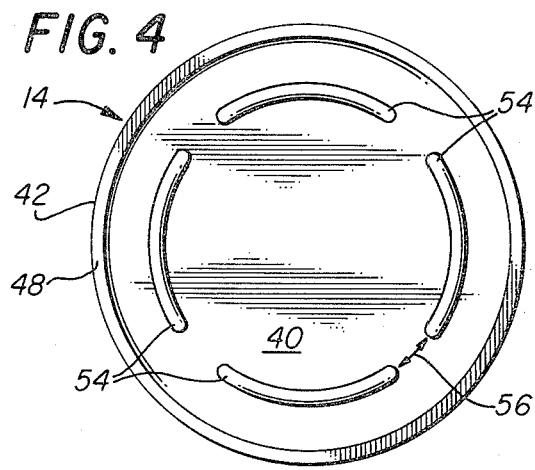
FIG. 4 is the top plan view of a drainage tray.

A tray 14 (FIG. 4) supports the pot 12 in an upright position and includes a closed bottom surface 40 and an upturned sidewall 42 for containing a volume of water 44. The tray sidewall 42 and pot sidewall 20 define an open reservoir space 46 between the two sidewalls when the pot 12 is received within the tray. Bottom watering is carried out by pouring water into the open reservoir space 46.

Figure 5:
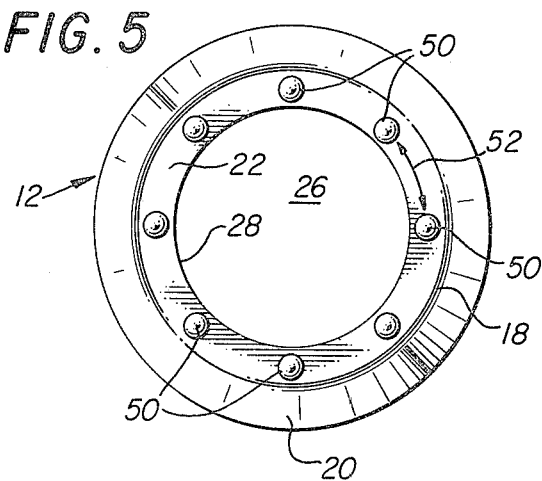
FIG. 5 is a bottom view of the pot container shown in FIG. 1.

In order to carry out either top watering with drainage or bottom watering with capillary flow from the open reservoir space 46 to the plant 36, it is necessary to support the bottom opening 26 of the pot above the bottom surface 40 of the tray and below the top 48 of the tray sidewall 42. This is accomplished by a support means interposed between the pot and the tray comprising a plurality of axially projecting feet 50 (FIG. 5) which depend from the bottom side of the lip 22. The feet 50 are preferably rounded projections which are circumferentially spaced with respect to each other thereby defining a flow passage 52 between adjacent feet. The flow passage 52 communicates with the bottom opening 26 and the open reservoir space 46 thereby permitting water to drain freely through the soil 34 into the reservoir space 46. This arrangement also allows reverse capillary flow of moisture when bottom watering through the open reservoir space 46.

According to another preferred embodiment, the bottom opening 26 of the pot is supported above the bottom surface 40 of the tray and below the top of the tray sidewall by elongated, curved ridge portions 54 (FIG. 4) which are circumferentially spaced with respect to each other and which project from the tray bottom 40 for engaging the under side of the pot 20.

It is preferred that both the feet 50 and curved ridge portions 54 be provided in a complementary fitting arrangement as illustrated in FIG. 3 so that the pot 12 will be automatically centered within the tray for a pleasing appearance and to provide equal access to the open reservoir space 46 on all sides of the assembly 10. However, it should be understood that either the spaced arrangement of feet 50 or the spaced arrangement of curved ridge portions 54 may be used for supporting the bottom opening 26 at an elevated position between the top 48 of the tray sidewall and the bottom 40 of the tray. Both top watering and bottom watering can be carried out when the feet 50 are omitted and only the curved ridge portions 54 are utilized since the curved ridge portions are circumferentially spaced with respect to each other and define flow passages 56 between the ends of adjacent ridges.

Figure 6:
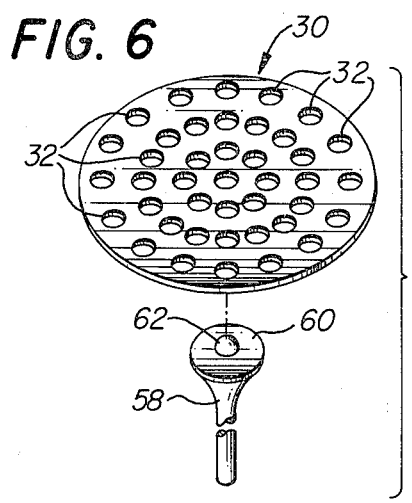
FIG. 6 is a perspective view of a drainage disk.

When it is desired to remove the rooted plant 36 from the pot 12, the drainage disc 30 is pushed upwardly along the axis 57 (FIG. 2) through the pot sidewall 20 to displace the plant 36 and the surrounding soil in which it is rooted out of the pot without disturbing the soil or the root system of the plant. Consequently, the process of removing the plant from the pot causes very little disturbance to the plant or its root system and also minimizes the loss of potting soil. The sidewall 20 of the pot is preferably an upwardly flaring conical surface which offers minimum resistance to the movement of the potting soil plug. The displacement of the drainage disc 30 along with the plug of potting soil and plant may be carried out manually by pushing against the bottom of the drainage disc 30 with hand or fingers or with a push rod tool 58 as shown in FIG. 6. It may be desirable to use the push rod tool 58 when the bottom opening 26 is too small to accommodate a person's hands and fingers. The push rod tool 58 is preferably flared with a flat engaging surface 60 and a rounded projection 62 for engaging the flat surface of the drainage disc 30 and the center drainage opening 32, respectively.

Each component of the transplant container assembly 10 may be made of a plastic material such as polyolefin, such as, polypropylene, or polyethylene. Polyolefin materials are preferred since they are chemically resistant and are not toxic to plants. To improve stiffness and rigidity of the components, it is preferred to add a minor amount of stiffness agent such as polystyrene. Other conventional materials such as ceramic, lightweight aluminum and clay may be used to good advantage. However, it is believed that plastic is the most economical and effective material since it can be easily injection molded.

Although preferred embodiments of the invention have been described in detail, it should be understood that various changes, substitutions and alterations can be made therein without departing from the spirit and scope of the invention as defined by the appended claims.

What is claimed is:

1. A container assembly for growing and transplanting plants comprising, in combination, a pot having an open top end, an open bottom end, an upwardly flaring conical sidewall disposed between the top and bottom ends, and an annular flange projecting into the interior of said pot from the sidewall near the bottom end defining the open bottom end, said flange being inwardly, radially spaced from said sidewall; bottom disc removably supported on the annular flange within the interior of said pot and covering the open bottom end, said bottom disc having at least one drainage opening overlying the open bottom end for permitting water to drain from soil enclosed within said pot through the open bottom end, and said bottom disc being upwardly movable through said pot for displacing a volume of soil and a rooted plant through the top opening without disturbing the soil surrounding the roots of the plant; a tray for supporting said pot in an upright position, said tray having a closed bottom panel and an upturned sidewall projecting from the closed bottom panel, said tray bottom panel, tray sidewall and pot sidewall defining an open annular reservoir space between the sidewall of the tray and the sidewall of the pot when the pot is received within the tray; and, interlocking support means mounted on said pot and on said tray for centering and removably supporting the open bottom end of said pot above the bottom panel of said tray and below the top of the tray sidewall and for providing fluid communication between the open reservoir space and the intermediate opening, said interlocking support means including a circular array of axially projecting feet depending from said flange, said feet being spaced relative to each other thereby defining a flow passage between adjacent feet, and a circular array of elongated, curved ridge segments projecting upright from the tray bottom panel, said curved ridge segments being spaced relative to each other thereby defining a flow passage between adjacent ridge segments, the circular array of axially projecting feet being concentrically aligned with the circular array of ridge segments, said axially projecting feet and ridge segments being engageable to define a male and female connection for securing said pot into engagement with said tray.

* * * * *